United States Patent
Manning et al.

(10) Patent No.: US 9,810,079 B2
(45) Date of Patent: Nov. 7, 2017

(54) CYCLONIC DIRT SEPARATING TURBINE ACCELERATOR

(71) Applicant: General Electric Company, Schenectady, NY (US)

(72) Inventors: Robert Francis Manning, Newburyport, MA (US); Victor Hugo Silva Correia, Milton Mills, NH (US)

(73) Assignee: General Electric Company, Schenectady, NY (US)

( * ) Notice: Subject to any disclaimer, the term of this patent is extended or adjusted under 35 U.S.C. 154(b) by 613 days.

(21) Appl. No.: 13/836,737

(22) Filed: Mar. 15, 2013

(65) Prior Publication Data

US 2014/0290254 A1    Oct. 2, 2014

(51) Int. Cl.
| | |
|---|---|
| *F01D 9/02* | (2006.01) |
| *F01D 5/08* | (2006.01) |
| *F01D 25/12* | (2006.01) |
| *F01D 25/32* | (2006.01) |
| *F02C 7/052* | (2006.01) |

(52) U.S. Cl.
CPC ............... *F01D 9/02* (2013.01); *F01D 5/081* (2013.01); *F01D 25/12* (2013.01); *F01D 25/32* (2013.01); *F02C 7/052* (2013.01); *F05D 2260/607* (2013.01); *Y02T 50/676* (2013.01)

(58) Field of Classification Search
CPC .......... F01D 25/12; F01D 25/32; F01D 5/081; F01D 9/02; F02C 7/052; F05D 2260/607; Y02T 50/676
USPC ................... 60/752, 775, 785; 415/115, 116; 416/97 R
See application file for complete search history.

(56) References Cited

U.S. PATENT DOCUMENTS

| | | | |
|---|---|---|---|
| 3,521,431 A * | 7/1970 | Buckley et al. | ............... 55/306 |
| 3,918,835 A | 11/1975 | Yamarik et al. | |
| 4,309,147 A | 1/1982 | Koster et al. | |
| 5,951,250 A | 9/1999 | Suenaga et al. | |

(Continued)

FOREIGN PATENT DOCUMENTS

| | | |
|---|---|---|
| CN | 101660449 A | 3/2010 |
| EP | 0116722 | 4/1987 |

OTHER PUBLICATIONS

Unofficial English Translation of Chinese Office Action issued in connection with corresponding CN Application No. 201480016097.3 dated Feb. 24, 2016.

(Continued)

*Primary Examiner* — Mark Laurenzi
*Assistant Examiner* — Dapinder Singh
(74) *Attorney, Agent, or Firm* — General Electric Company; William Scott Andres

(57) ABSTRACT

A dirt separator assembly for a gas turbine engine comprises a cyclonic accelerator in flow communication with compressor discharge air, the accelerator having a plurality of passages, each passage having an inlet, an outlet and at least one vent located in the passage, a plurality of turning vanes disposed along each of the passages, the passage turning tangentially between the inlet and the outlet, the accelerator passages decreasing from a first cross-sectional area to a second cross-sectional area and said turning vanes inducing helical swirl of compressed cooling air, and, at least one vent located in the accelerator passages for expelling dust separated from the swirling compressed cooling air.

23 Claims, 5 Drawing Sheets

(56) References Cited

U.S. PATENT DOCUMENTS

| | | |
|---|---|---|
| 6,151,881 A | 11/2000 | Ai et al. |
| 6,308,511 B1 | 10/2001 | Beeck et al. |
| 8,147,178 B2 | 4/2012 | Ottaviano et al. |
| 8,167,980 B2 | 5/2012 | Hiner et al. |
| 8,176,720 B2 | 5/2012 | Beeck |
| 2008/0310951 A1* | 12/2008 | Bremer ............... 415/121.2 |

OTHER PUBLICATIONS

PCT Search Report and Written Opinion issued in connection with corresponding Application No. PCT/US2014/017605 dated Jun. 12, 2014.

* cited by examiner

CYCLONIC DIRT SEPARATING TURBINE ACCELERATOR

BACKGROUND

The present embodiments relate generally to a gas turbine engine. More particularly, but not by way of limitation, the present invention relates to a dirt separating accelerator which inhibits dust, dirt or other particulate passing through the turbine in the cooling air flowpaths and from entering the turbine rotor with the rotor cooling air.

A typical gas turbine engine generally possesses a forward end and an aft end with its several core or propulsion components positioned axially therebetween. An air inlet or intake is located at a forward end of the engine. Moving toward the aft end, in order, the intake is followed by a fan, a compressor, a combustion chamber, and a turbine. It will be readily apparent from those skilled in the art that additional components may also be included in the engine, such as, for example, low-pressure and high-pressure compressors, and low-pressure and high-pressure turbines. This, however, is not an exhaustive list.

The compressor and turbine generally include rows of airfoils that are stacked axially in stages. Each stage includes a row of circumferentially spaced stator vanes and a row of rotor blades which rotate about a center shaft or axis of the turbine engine. A multi-stage low pressure turbine follows the multi-stage high pressure turbine and is typically joined by a second shaft to a fan disposed upstream from the compressor in a typical turbo fan aircraft engine configuration for powering an aircraft in flight.

The stator is formed by a plurality of nozzle segments which are abutted at circumferential ends to form a complete ring about the axis of the gas turbine engine. Each nozzle segment may comprise one or more vanes, which extend between an inner band and an outer band.

A typical gas turbine engine utilizes a high pressure turbine and low pressure turbine to maximize extraction of energy from high temperature combustion gas. The turbine section typically has an internal shaft axially disposed along a center longitudinal axis of the engine. The blades are circumferentially distributed on a rotor causing rotation of the internal shaft. The internal shaft is connected to the rotor and the air compressor, such that the turbine provides a rotational input to the air compressor to drive the compressor blades. As the combustion gas flows downstream through the turbine stages, energy is extracted therefrom and the pressure of the combustion gas is reduced.

In operation, air is pressurized in a compressor and mixed with fuel in a combustor for generating hot combustion gases which flow downstream through turbine stages. These turbine stages extract energy from the combustion gases. A high pressure turbine first receives the hot combustion gases from the combustor and includes a stator nozzle assembly directing the combustion gases downstream through a row of high pressure turbine rotor blades extending radially outwardly from a supporting rotor disk. The stator nozzles turn the hot combustion gas in a manner to maximize extraction at the adjacent downstream turbine blades. In a two stage turbine, a second stage stator nozzle assembly is positioned downstream of the first stage blades followed in turn by a row of second stage rotor blades extending radially outwardly from a second supporting rotor disk. The turbine converts the combustion gas energy to mechanical energy.

Dust accumulation and plugging of cooled turbine blades causes reduced airfoil durability and premature performance deterioration in part by increased tip clearances and airfoil distress. This deterioration is particularly notable in environments which are dusty or include large amounts of sand, such as deserts or arid regions.

Operators who fly or utilize turbine technology in these regions historically have early engine deterioration or distress due to the abundance of particulate dust or dirt in the air. This results in engine downtime sooner than a normal maintenance interval.

It would be desirable to overcome these and other deficiencies by improving turbine blade durability. It would also be desirable to extend the operating life of the engines which may be shortened due to operation in these dirty regions of the world. Further, it would be desirable to reduce the amount of dirt or dust that enters the turbine cooling air supply system, or the blade cooling circuit, so that the blade cooling circuit is less likely to be plugged with dirt, avoiding over temperature of the blade, blade distress and eventually engine deterioration.

It would be desirable to overcome these and other deficiencies with gas turbine engines and more specifically it would be desirable to inhibit dust and dirt from entering a rotor cooling circuit within a gas turbine engine.

SUMMARY

A dirt separator assembly for a gas turbine engine comprises a cyclonic accelerator in flow communication with compressor discharge air, the accelerator having a plurality of passages, each passage having an inlet, an outlet and at least one vent located in the passage, a plurality of turning vanes disposed along each of the passages, the passage turning tangentially between the inlet and the outlet, the accelerator passages decreasing from a first cross-sectional area to a second cross-sectional area and said turning vanes inducing helical swirl of compressed cooling air, and, at least one vent located in the accelerator passages for expelling dust separated from the swirling compressed cooling air. The accelerator passages according to some embodiments may include a turning vane. Additionally, the accelerator passages may further include a centerbody disposed within passages.

According to some aspects of the present embodiments, the accelerator defines a second stage of separation. A deflector disposed upstream of the accelerator may define a first stage.

All of the above outlined features are to be understood as exemplary only and many more features and objectives of the dirt separating turbine accelerator may be gleaned from the disclosure herein. Therefore, no limiting interpretation of this summary is to be understood without further reading of the entire specification, claims, and drawings included herewith.

BRIEF DESCRIPTION OF THE ILLUSTRATIONS

The above-mentioned and other features and advantages of these exemplary embodiments, and the manner of attaining them, will become more apparent and the two stage dust separator for a gas turbine engine will be better understood by reference to the following description of embodiments taken in conjunction with the accompanying drawings, wherein.

DETAILED DESCRIPTION

Figure 1:
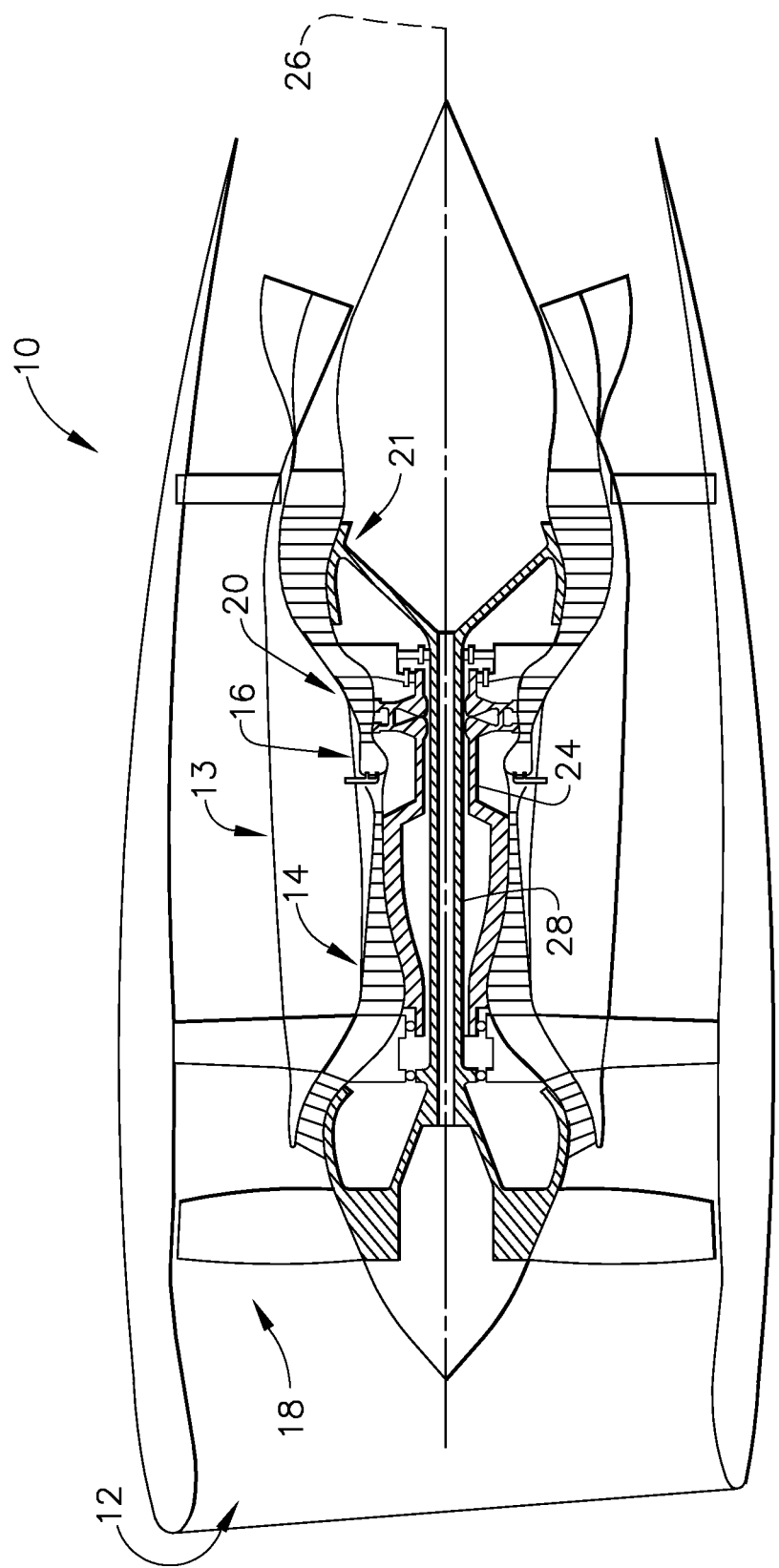
FIG. 1 is a side section view of an exemplary gas turbine engine.

Reference now will be made in detail to embodiments provided, one or more examples of which are illustrated in the drawings. Each example is provided by way of explanation, not limitation of the disclosed embodiments. In fact, it will be apparent to those skilled in the art that various modifications and variations can be made in the present embodiments without departing from the scope or spirit of the disclosure. For instance, features illustrated or described as part of one embodiment can be used with another embodiment to still yield further embodiments. Thus it is intended that the present invention covers such modifications and variations as come within the scope of the appended claims and their equivalents.

Referring to FIGS. 1-8, various embodiments of a gas turbine engine are depicted a two stage dirt separator including a cyclonic accelerator. According to some embodiments, a two stage separator is taught wherein a first stage structure is provided to cause air to follow a tortuous path wherein momentum carries the particles from the tortuous path. A second stage includes an accelerator creating a cyclonic or rotational flow of air which also separates dirt from the fluid flow prior to the cooling air entering a rotor cooling air cavity.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the rear or outlet of the engine, or a component being relatively closer to the outlet than the inlet.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component. As used herein, the terms "lateral" or "laterally" refer to a dimension that is perpendicular to both the axial and radial dimensions.

Referring initially to FIG. 1, a schematic side section view of a gas turbine engine 10 is shown. The function of the gas turbine engine is to extract energy from high pressure and temperature combustion gases and convert the energy into mechanical energy for work. The gas turbine engine 10 has an engine inlet end 12 wherein air enters the core or propulsor 13 which is defined generally by a compressor 14, a combustor 16 and a multi-stage high pressure turbine 20. Collectively, the propulsor 13 provides power during operation. The gas turbine 10 may be used for aviation, power generation, industrial, marine or the like.

In operation air enters through the air inlet end 12 of the engine 10 and moves through at least one stage of compression where the air pressure is increased and directed to the combustor 16. The compressed air is mixed with fuel and burned providing the hot combustion gas which exits the combustor 16 toward the high pressure turbine 20. At the high pressure turbine 20, energy is extracted from the hot combustion gas causing rotation of turbine blades, which in turn cause rotation of the shaft 24. The shaft 24 passes toward the front of the engine to continue rotation of the one or more compressor stages 14, a turbofan 18 or inlet fan blades, depending on the turbine design. The turbofan 18 is connected by the shaft 28 to a low pressure turbine 21 and creates thrust for the turbine engine 10. A low pressure turbine 21 may also be utilized to extract further energy and power additional compressor stages.

Figure 2:
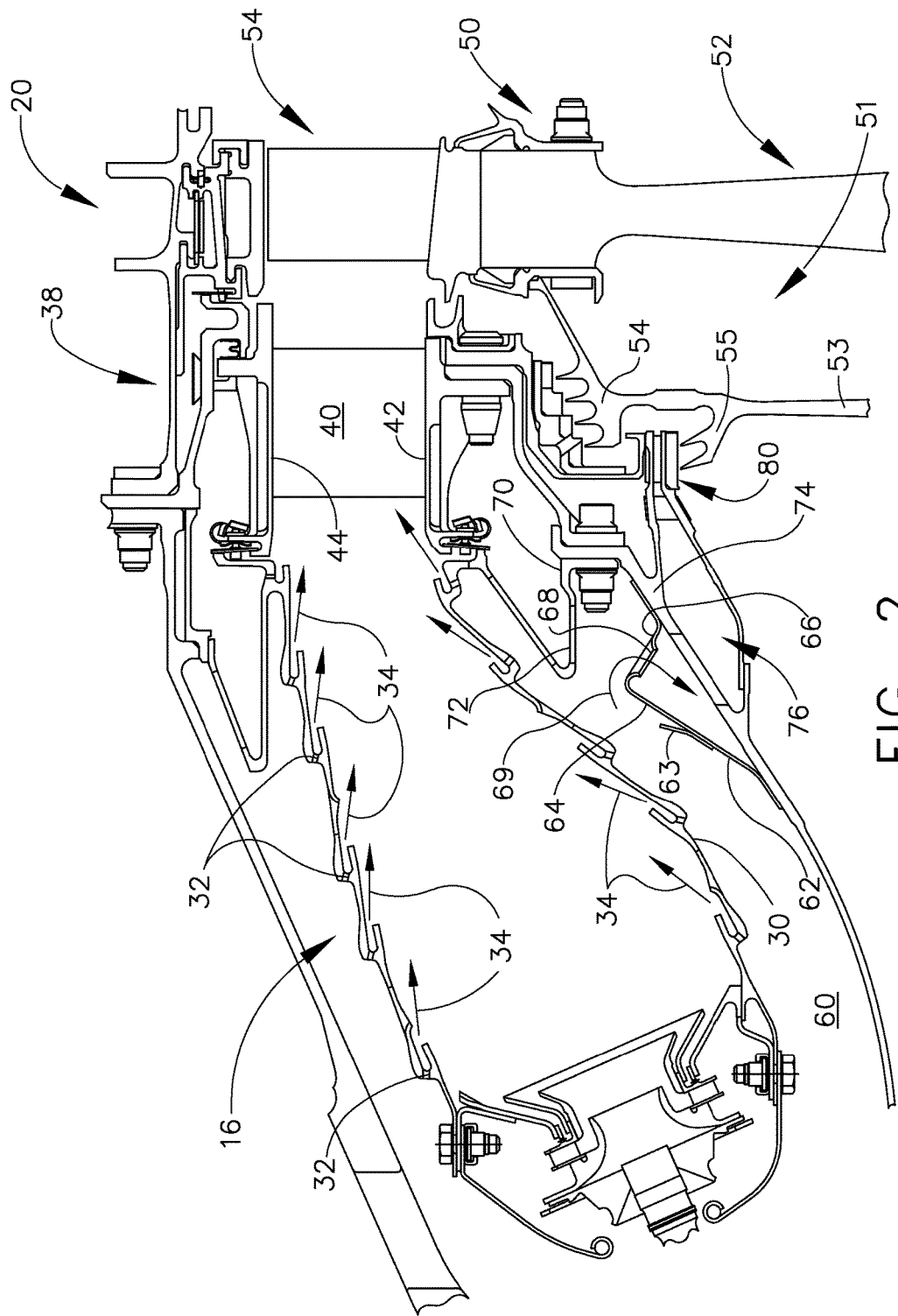
FIG. 2 is a side section view of a turbine at the interface with a combustor including the two stage separator.

Referring now to FIG. 2, a side section view of the combustor 16 and high pressure turbine 20 interface is depicted. In the side section view, the combustor 16 is shown with a combustor inner wall 30 having a plurality of apertures 32 allowing compressed air flow 34 to enter the combustor 16 and mix with fuel within the combustor 16 for ignition. High temperature combustion gas then passes from the combustor 16 to the high pressure turbine 20. The turbine 20 includes a nozzle 38 having a vane 40 extending between a radially inner platform 42 and a radially outer platform 44. The vane 40 has an airfoil shape and turns the high temperature combustion gas tangentially and/or circumferentially in a manner so as to maximize energy extraction from the downstream rotor assembly 50. The rotor assembly 50 includes a rotor disk 52 and a rotor blade 54 extending radially outwardly from the rotor disk 52. The rotor blade 54 rotates with the energy extracted from the combustion gas passing through the nozzle 38. Downstream of the rotor assembly 50 additional nozzles and turbines may define additional stages of a high pressure turbine 20 and/or a low pressure turbine 21.

In general, for purpose of understanding a portion of the cooling within the gas turbine engine 10, the compressor 14 creates compressed air, part of which "bleeds" off for cooling purposes. The cooling air passes through a combustor shell annulus 60 and through a rotating seal disk 53 into an inner rotor cavity 51. The cooling air then engages the rotor disk 52 and is pumped into the rotor for subsequent delivery to the rotor blades 54. The cooling air then cools the interior of the blade 54 before exiting the blade 54 into the combustion gas flow path.

With that understanding, attention is now directed to the flow path of cooling air more specifically. Disposed radially inwardly of the combustor inner wall 30 is the combustor shell annulus 60. Compressor discharge or bleed air passes through this annulus 60. Within this annulus, a deflector 62 is located to cause the compressed air cooling air flowpath to turn. The deflector 62 may unitarily extend circumferentially 360 degrees about the engine axis 26 (FIG. 1) or may surround the engine by way of two or more circumferentially extending segments. The deflector 62 includes a first wall 64 and at least a second wall 66. In the section view depicted, the first wall 64 and second wall 66 define a generally triangular shape along with frame member 74. The first wall 64 includes a primary deflector 63 which is angled away from wall 64 and the wall 66. The primary deflector causes the compressed airflow to move away from the wall 64 and away from wall 66 before entering a flowpath turn 69. The deflector 62 also causes the airflow to bend away from the turn 69, which further aids to separate particulate from the compressed air flow. Further, the second wall 66 includes one or more apertures 68. The first wall 64 and second wall 66 may be formed of a single piece of material or may be formed of separate pieces which are welded or brazed, for example. Compressor discharge air passes by the first wall 64 and turns near the joinder of the first wall 64 and the second wall 66. This turn 69 may be at least one turn or may be more than one turn. Each turn may be at least 90 degrees, for example. After the at least one turn, the compressor discharge air path 69 passes through the aperture 68.

The deflector 62 causes the compressed air moving through the combustor shell annulus 60 to follow a tortuous path 69 by turning up to 180 degrees and passing through the aperture 68. By creating this tortuous air path 69, momentum carries dirt particles discharge air linearly beyond the deflector 62 and out of the tortuous path 69, through the member 70. An aperture 72 in the member 70 allows the particulate to continue linearly away from the path of the cooling air. The particulate may travel through apertures 32 in the combustor inner wall 30. Since the momentum carries the particles through the member 70 or into the combustor, this deflector 62 and tortuous air path 69 define a first stage of the particulate separator.

Figure 3:
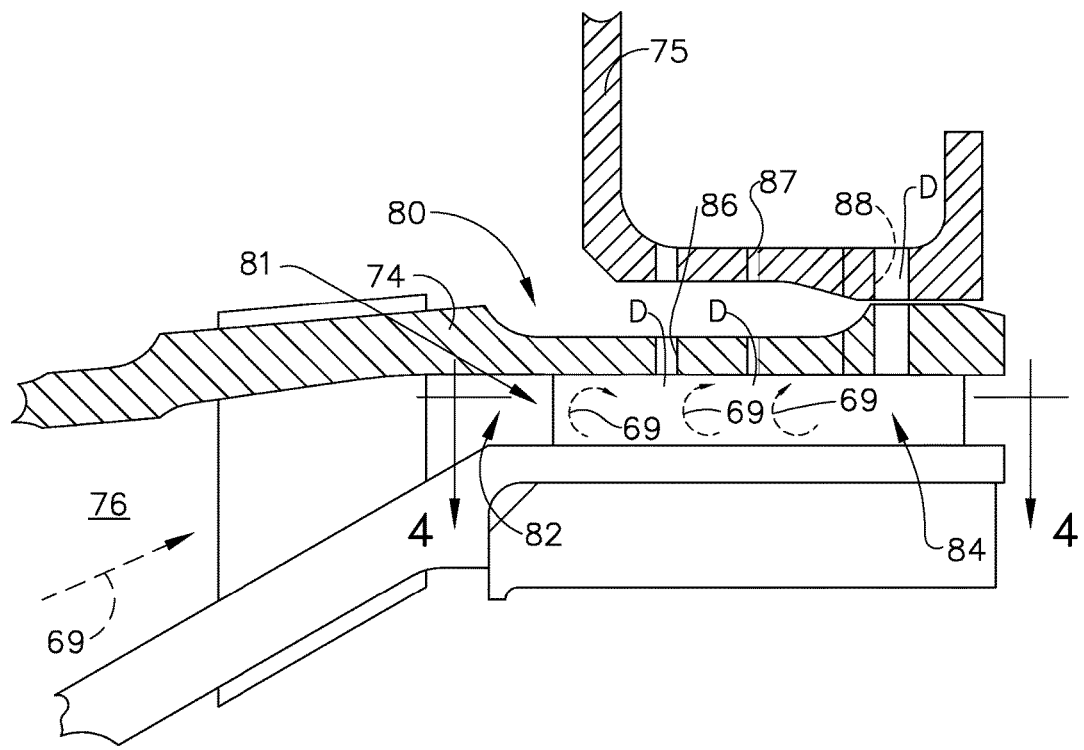
FIG. 3 is a side section view of an accelerator.

As the air passes through the annulus 60 and turns about the deflector 62, the turbine rotor blade cooling air passes through an opening in through a frame member 74 into a cavity 76. The cavity 76 narrows into an accelerator 80 having a plurality of passages 81 located about the engine 10. The accelerator passages 81 direct the compressor discharge air toward the rotor assembly 50 to cool the rotor disk 52 and the blade 54. With the compressor discharge air in the accelerator passage 81, attention is now turned to FIG. 3 which shows a detailed cross-section view of this second portion of the two stage separator. The accelerator 80, and more specifically the accelerator passages 81, provides a second stage of separation by turning the compressor discharge air tangentially and causing the air to swirl. Remaining dirt in this flowpath 69 rotates about an axis extending in the axial direction as it moves in the axial direction toward the rotor disk 52. As shown in FIG. 3, the cross-sectional area from the cavity 76 toward the accelerator 80 decreases. Each accelerator passage 81 comprises an inlet 82 of a first cross-sectional area and an exit or outlet 84 downstream of the inlet 82. The outlet 84 has a smaller cross-sectional area than the inlet 82. The inlet and outlet 82, 84 may be of similar shapes or may be of differing cross-sectional shapes. Along the path between the inlet 82 and the outlet 84, the wall of the accelerator 80 has a plurality of slits, vents or openings 86, 87 and 88. As remaining dirt is carried within the compressor discharge air 69 toward the accelerator 80, the air enters the inlet portion 82 and begins to rotate. During this rotation, tangential force carries the particulate to the outer wall of the accelerator passages 81. When the dirt or dust particles pass along the outer wall at the vents 86, the particles are released through these vents 86, 87 and 88 and exit the accelerator passages 81 while the remaining cleaner air continues moving through the accelerator passages 81 toward the outlet 84. The vents 86, 87 and 88 may take various shapes and sizes and may be sized to provide appropriate release of from the air. Additional design considerations may include air pressure across the accelerator 80 and air velocity through the accelerator 80. The dirt particles D are indicated passing through the vents 86, 87 and 88 as the compressor discharge air 69 swirls within the accelerator passages 81.

Figure 4:
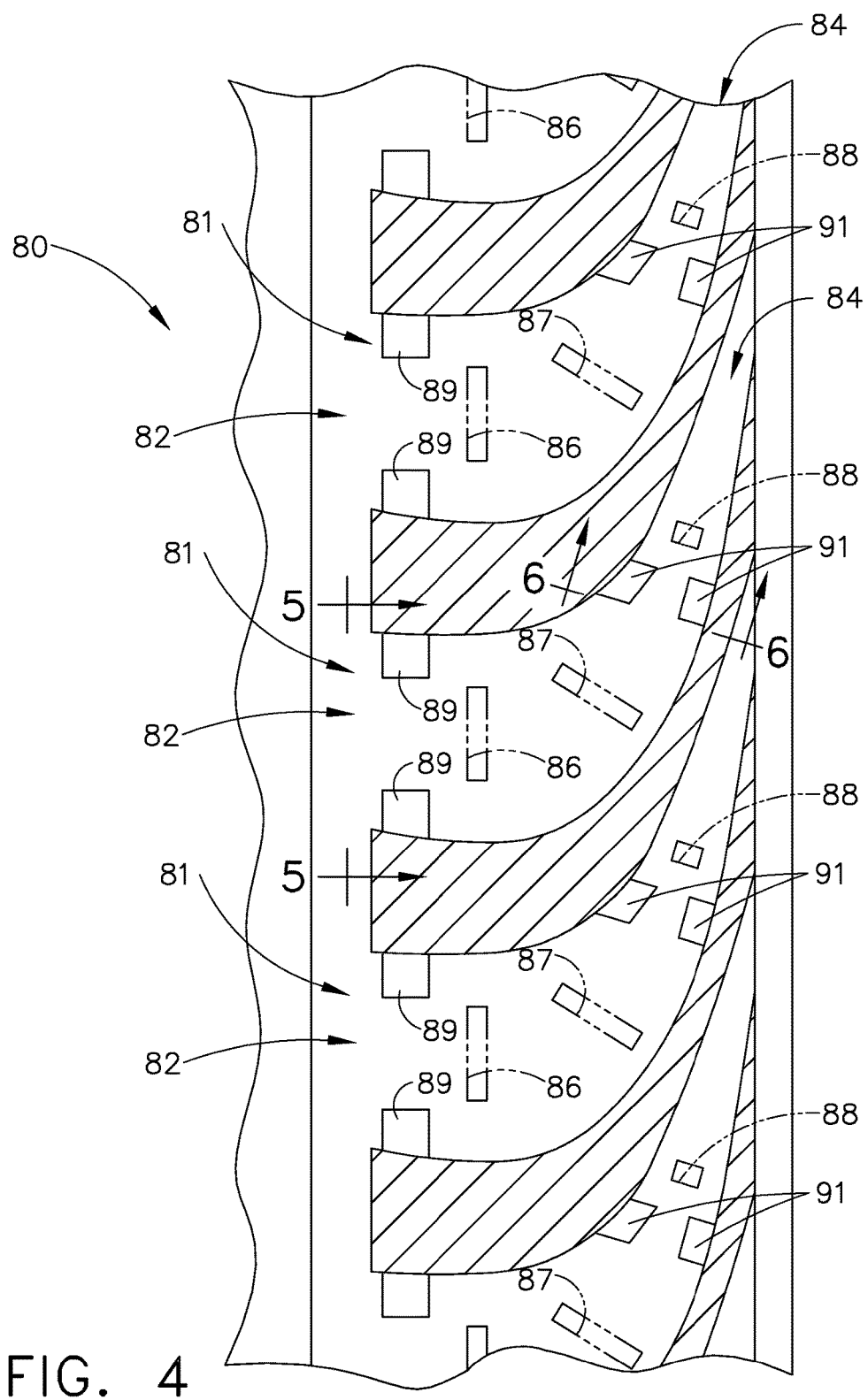
FIG. 4 is a section layout view of a plurality of accelerator passages.

With reference now to FIG. 4, a top section view of the accelerator 80 with the circumferential layout shown in a linear manner. At the left hand side of the figures each passage 81 has an inlet 82. The inlets 82 provide that air flow moves in an axial direction. As the compressed cooling air continues through the accelerator passage 81, the air turns tangentially toward the outlet 84. As previously discussed, the cross-sectional area of the inlet 82 is greater than the cross-sectional area of the outlet 84 which increases the speed of the compressor discharged air 69 passing through each accelerator passage 81.

Figures 5, 6:
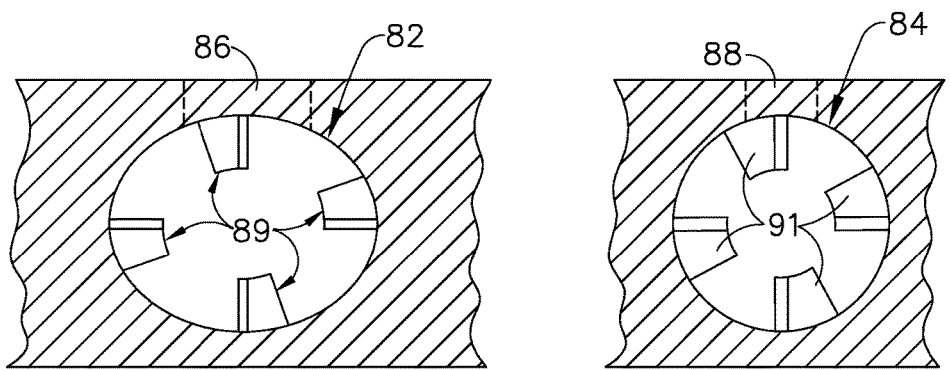
FIG. 5 is a section view of an entrance to an exemplary accelerator passage.
FIG. 6 is a section view of an exit from an exemplary accelerator passage.

At the inlet end 82 of the accelerator are turning vanes 89. Due to the cross-section depicted, only two vanes 89 are in view. With reference to FIG. 5, four vanes 89 are shown. However, various numbers of vanes may be utilized. Additionally, the vanes 89 may be linear to induce cyclical spinning of the compressor discharge air or the blades may bend in order to induce the rotation described through the accelerator passage 81. The vanes 89 are shown at equivalent positions along the axial or flow direction of the accelerator passage 81. However, the vanes 89 may be offset from one another if desirable to provide optional characteristics of air rotation. With reference still to FIGS. 4 and 5, the cross-sectional shape of the inlet 82 is oblong. However, alternate cross-sectional shapes may be utilized so that the disclosed embodiment of the inlet 82 is not limiting.

With reference still to FIG. 4, moving axially through the accelerator passages 81s, downstream of the inlet vanes 89 are first and second vents 86, 87. These are shown in broken line for reference relative to FIG. 3. The vent shapes may be a variety of geometric shapes and the exemplary schematic shapes shown should not be considered limiting.

The vents 86, 87, 88 extend upwardly through frame element 74 and an adjacent seal support structure 75 (FIG. 3). This passage through the frame member 74 and seal support structure 75 allows dirt particles to move toward an outer labyrinth seal 54 (FIG. 2) and outward from the engine core 13 (FIG. 1).

Downstream of the vanes 89 are additional turning vanes 91 which continue swirling of the discharge compressed air downstream of the vents 86, 87. The vanes 91 aid to continue rotation of the air toward a downstream vent 88 which further removes dirt, dust or particulate from the compressor discharged air passing through the accelerator passages 81. The remaining air which moves beyond the vent 88 may or may not be deswirled and continues to the accelerator outlet 84 to cool the rotor 52 and inner rotor cavity 51 (FIG. 2). Such deswirling may occur though use of additional vanes oppositely oriented to reduce the swirl of the cooling air. Additionally, with reference again to FIG. 2, the air passes through the outlets 84 of the accelerator passages 81 and must pass through a seal arm 53 to enter the rotor cavity 51 and cool the rotor 52. The seal arm 53 may include a plurality of holes therein to allow passage of the air from the accelerator 80 through the arm 53 and into the rotor cavity 51.

With reference now to FIG. 6, a cross-sectional view of the accelerator 80 is depicted. The section view is shown at the section 6 line depicted in FIG. 4. This position is just forward of the vanes 91 which induce cyclical air motion as previously described. Although four vanes 91 are shown in FIG. 6, various numbers may be utilized and may be offset in tangential directions or may be aligned in tangential directions as shown. Additionally, an alternative embodiment may comprise structure such that pairs of vanes 89, 91 may form be a continuous turning vanes spiraling along the flow direction of the accelerator passage 81. The vent 88 is also shown in FIG. 6.

Figure 7:
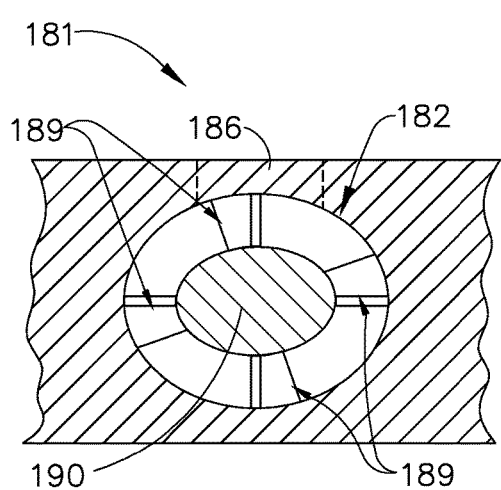
FIG. 7 is a section view of an alternative accelerator passage at an entrance; and, FIG. 8 is a section view of the alternative accelerator passage at an exit.
Figure 8:
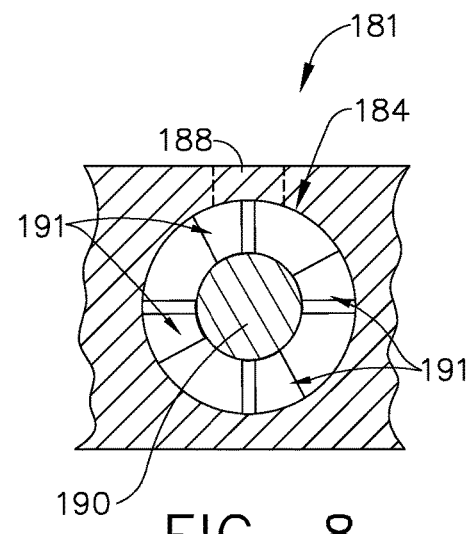

With reference now to FIGS. 7 and 8 an alternative accelerator passage is depicted having a centerbody. Referring first to FIG. 7, a cross-sectional view of an accelerator passage 181 is depicted. The passage 181 is shown from the inlet 182 looking aft. The depicted embodiments include turning vanes 189 which may linear surfaces or may have arcuate bending surfaces. According to this embodiment, a centerbody 190 may be disposed at the radially inner edges of the vanes 189. The centerbody 190 is therefore suspended within the passage 181 and extends some distance in the flow path direction. The centerbody 190 is generally oblong in shape at the inlet 182 corresponding to the shape of the passage 181 at the inlet 182. As with the previous embodiments, this inlet shape may ary and accordingly the centerbody 190 shape may vary as well. However, additionally, it should be understood that the centerbody cross-sectional shape need not match the cross-sectional shape of the inlet 182.

With reference now to FIG. 8, a cross-sectional view of the accelerator passage 181 is shown at the accelerator passage outlet 184. The centerbody 190 is again shown extending between vanes 191 and is of a smaller cross section than at the inlet 182 (FIG. 7). This is in part due to the smaller cross-sectional area at the outlet. As shown, the centerbody 184 has a cross-sectional area at the outlet 184 which is less than that the area at the inlet 182. Additionally, although the cross-sectional shape of the centerbody 190 at the outlet 184 approximates the outlet 184 cross-sectional shape, it is well within the scope of the present disclosure that the shapes may differ.

The centerbody 190 may extending between the between the vanes 189 and 191. Alternatively the vanes may extend a further distance or a shorter distance. In addition, the cenerbody may be broken up into multiple segments rather than a single portion extending between the blades 189 and 191.

While multiple inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Examples are used to disclose the embodiments, including the best mode, and also to enable any person skilled in the art to practice the apparatus and/or method, including making and using any devices or systems and performing any incorporated methods. These examples are not intended to be exhaustive or to limit the disclosure to the precise steps and/or forms disclosed, and many modifications and variations are possible in light of the above teaching. Features described herein may be combined in any combination. Steps of a method described herein may be performed in any sequence that is physically possible.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A dirt separator assembly for a gas turbine engine having a compressor, a combustor, and a turbine in serial flow relation, comprising:
    a cyclonic accelerator in flow communication with compressor discharge air and located downstream of the compressor, said accelerator having a plurality of passages, each passage having an inlet, an outlet and at least one vent located in said passage;
    a plurality of turning vanes disposed along each of said passages, said plurality of turning vanes in said passages turning air in said passages tangentially between said inlet and said outlet;
    said accelerator passages decreasing from a first cross-sectional area to a second cross-sectional area and said turning vanes inducing helical swirl of compressed cooling air; and,
    said at least one vent located in an outer wall of said accelerator passage for expelling dust separated from said swirling compressed cooling air exiting the accelerator assn a throu h said at least one vent via rotational, tangential force and outward from an engine core of the gas turbine engine.

2. The dirt separator assembly of claim 1, wherein clean air is provided for cooling turbine blades.

3. The dirt separator assembly of claim 1, said vent being located on each of said passages.

4. The dirt separator assembly of claim 1, further comprising a first stage deflector upstream of said accelerator creating a turn in said compressed cooling air.

5. The dirt separator assembly of claim 1, said accelerator including a plurality of helical vanes along an inner surface.

6. The dirt separator assembly of claim 5 further comprising at least one center body extending between said helical vanes.

7. The dirt separator assembly of claim 6, said at least one center body being formed of multiple segments.

8. A dirt separator for a gas turbine engine, comprising:
a cooling air flow path disposed in a turbine frame;
an accelerator located in said frame portion, said accelerator in fluid communication with said cooling air flow path;
a deflector extending over a cooling air aperture between said cooling air flow path and said accelerator, said deflector creating a tortuous path for cooling air passing from said cooling air duct to said accelerator;
said accelerator having an accelerator passage including an inlet of a first cross-sectional area, an outlet of a second smaller cross-sectional area, and a plurality of turning vanes therein; and
said accelerator passage including at least one vent located in an outer wall of said accelerator passage for removal of particulate from said passage through said vent via rotational, tangential force and outward from an engine core of the gas turbine engine.

9. The dirt separator of claim 8, said accelerator being disposed radially inward or outward of a turbine rotor seal.

10. The dirt separator of claim 8, said vent in flow communication with a rotor seal cavity.

11. The dirt separator of claim 10, said dirt passing through said vent toward an outer rotor cavity seal.

12. The dirt separator of claim 8, said vent disposed one of forward or in a throat region of said accelerator.

13. The dirt separator of claim 8, further comprising multiple vents.

14. The dirt separator of claim 8, said turning vanes creating cyclonic swirling therein.

15. The dirt separator of claim 8, further comprising a seal arm.

16. The dirt separator of claim 8, further comprising at least one flow aperture in said seal arm.

17. The dirt separator of claim 16, said at least one aperture being axially aligned with said accelerator.

18. A two stage particle separator for a gas turbine engine, comprising:
a combustor wall and a combustor inner liner shell defining a substantially annular flow path;
a deflector disposed in said substantially annular flow path and overlying an accelerator inlet. the deflector defining a tortious air path and forming a first stage particle separator with separated particles traveling through the combustor wall;
an accelerator downstream of the deflector forming a second stage particle separator having said inlet and an outlet and changing from a larger cross-section at said inlet to a smaller cross-section at an outlet;
said accelerator having an outer surface including at least one vent passing through said outer surface for expelling dust outward through said at least one vent via rotational, tangential force exiting the accelerator and outward from an engine core of the gas turbine engine.

19. The two stage particle separator of claim 18, said annular flow path in fluid communication with a high pressure compressor.

20. The two stage particle separator of claim 19, said separator receiving bleed air from said high pressure compressor.

21. The two stage particle separator of claim 18, said accelerator outlet directing cooling air toward a turbine rotor disk.

22. The two stage particle separator of claim 21, said cooling air passing through at least one aperture in a blade turbine.

23. The two stage particle separator of claim 18 further comprising at least one vane to deswirl colling air flow prior to said outlet.

* * * * *